(12) United States Patent
Ebbenga et al.

(10) Patent No.: US 8,596,906 B2
(45) Date of Patent: Dec. 3, 2013

(54) RETRACTABLE WHEEL FOR BOAT LIFT AND OTHER STRUCTURES

(75) Inventors: Mark Ebbenga, Forest Lake, MN (US); Dana Haliberg, Forest Lake, MN (US); Dan Coates, Forest Lake, MN (US)

(73) Assignee: Smarte Jack, Inc., Forest Lake, MN (US)

( * ) Notice: Subject to any disclaimer, the term of this patent is extended or adjusted under 35 U.S.C. 154(b) by 402 days.

(21) Appl. No.: 12/682,663

(22) PCT Filed: Jan. 20, 2010

(86) PCT No.: PCT/US2010/021476
§ 371 (c)(1),
(2), (4) Date: Apr. 12, 2010

(87) PCT Pub. No.: WO2010/090829
PCT Pub. Date: Aug. 12, 2010

(65) Prior Publication Data
US 2011/0268505 A1    Nov. 3, 2011

Related U.S. Application Data

(60) Provisional application No. 61/146,105, filed on Jan. 21, 2009.

(51) Int. Cl.
*B63C 3/06* (2006.01)
(52) U.S. Cl.
USPC ............................... 405/3; 114/44; 280/414.1
(58) Field of Classification Search
USPC ......... 405/3, 221; 114/44; 187/267; 254/254; 280/414.1
See application file for complete search history.

(56) References Cited

U.S. PATENT DOCUMENTS

| | | | | |
|---|---|---|---|---|
| 2,736,568 A | * | 2/1956 | Martin | 280/43.19 |
| 2,952,473 A | * | 9/1960 | Legge | 280/6.153 |
| 5,197,311 A | * | 3/1993 | Clark | 70/232 |
| 5,224,569 A | * | 7/1993 | Hewitt et al. | 187/259 |
| 6,361,252 B1 | * | 3/2002 | Leitheiser | 405/221 |

(Continued)

FOREIGN PATENT DOCUMENTS

WO    2008051991 A2    5/2008

OTHER PUBLICATIONS

International Search Report and Written Opinion from corresponding PCT/US2010/021476, mailed Sep. 3, 2010.

*Primary Examiner* — Benjamin Fiorello
(74) *Attorney, Agent, or Firm* — Westman, Champlin & Koehler, P.A.; Z. Peter Sawicki

(57) ABSTRACT

An assembly for attaching to a boat lift 12 includes a boat lift 12 attachment mechanism 70 for attaching to the boat lift 12; an outer support 24; an inner support 26 slidable within an interior of the outer support 24; a tire 22 attached to the inner support 26; and a stop member 82 extending from the outer support 24 to engage the tire 22 when the inner support 26 is retracted into the outer support 24. An outer surface of the inner support 26 is configured to be mateable with an inner surface of the outer support 24, thereby preventing rotation therein while permitting longitudinal movement with respect to the outer support 24. In another aspect, an assembly includes an axle 54 attached to the inner support 26 for the attachment of a ground engaging member. A method of leveling a boat lift 12 includes causing substantially vertical movements of first and second portions of the boat lift 12 until the boat lift 12 is horizontally level.

13 Claims, 5 Drawing Sheets

(56) References Cited

U.S. PATENT DOCUMENTS

| | | | |
|---|---|---|---|
| 6,520,102 B1 * | 2/2003 | Johnson | 114/44 |
| 7,059,803 B2 * | 6/2006 | Floe et al. | 405/3 |
| 8,096,729 B2 * | 1/2012 | Galik | 405/3 |
| 2005/0274311 A1 | 12/2005 | Shackelford, Jr. | |
| 2006/0147269 A1 | 7/2006 | Spratt et al. | |

* cited by examiner

RETRACTABLE WHEEL FOR BOAT LIFT AND OTHER STRUCTURES

CROSS-REFERENCE TO RELATED APPLICATION

The present application is based on and claims the benefit of U.S. provisional patent application Ser. No. 61/146,105, filed Jan. 21, 2009, the content of which is hereby incorporated by reference in its entirety.

This application is a Section 371 National Stage Application of International Application No. PCT/EP2010/021476, filed Jan. 20, 2010, the content of which is hereby incorporated by reference in its entirety.

BACKGROUND

This disclosure relates to retractable wheels and in particular, it relates to the use of such retractable wheels in outdoor applications such as boat lifts and ice houses.

Boat lifts are structures for storing boats or personal watercraft out of the water. The boat lift itself is in the water and includes a mechanism to lift the boat above the water line. The boat is generally floated over the mechanism, within the confines of the boat lift structure. The boat is typically lifted by a movable cradle that can be raised to lift the watercraft into a storage position out of water contact. Conversely, this mechanism can lower the watercraft onto the water until the watercraft freely floats on the water. The cradle of the boat lift may be powered either manually or by motor.

In northern locales, where the body of water freezes during the winter, boat lifts are generally freestanding structures that can be taken out of the water. If the boat lift is not taken out of the water, it may be subjected to the movement of ice during spring thaw, which may result in irreparable damage to the boat lift. Therefore, before the water freezes, the boat lift is removed from the water. In the spring, once the ice melts, the boat lift is then put back into the water.

Installing and removing a boat lift can sometimes be a difficult operation. On many populous lakes, services exist by which a barge and a crane are used to lift the boat lift in and out of the water. However, due to the cost of such a service, many boat lift owners install and remove the boat lift without the aid of such a service.

Since a freestanding boat lift has sufficient integrity to hold a boat sometimes weighing over 5,000 pounds, the boat lift itself can be of considerable weight. Even with the use of brute force by a number of strong people, installing and removing a boat lift can be a considerable task.

Some boat lifts have wheels so that they can be rolled into and out of the body of water. However, such wheels may have to be chocked. If the wheels are not chocked, wave action from the water may move the boat lift. In addition, if the ground beneath the water's surface is sloped, the boat lift may move away from shore due to the slope. Such chocking typically requires one to go underwater to place a wedge or other obstruction next to the wheel to prevent it from turning. This task can be unpleasant when the water is cold or murky.

Accordingly, there is a need for an apparatus and method for facilitating the installation, securement and removal of a boat lift or similar structure.

SUMMARY

This disclosure includes a wheel assembly that can be secured to an existing boat lift or other structure such that the boat lift or other structure is movable from a desired location. Moreover, the wheels can be retracted sufficiently so that the boat lift or other structure engages the ground and cannot be moved by the current, wind, inertia or other environmental forces.

Specifically, a retractable wheel of this disclosure includes a first mechanism for attaching to a boat lift or other structure; a second mechanism for disengaging the wheel from the ground so that the boat lift or other structure thereby engages the ground; and a stop for stopping the wheel from rotating due to movement of the water.

In one aspect, an assembly for attaching to a structure includes a structure attachment mechanism for attaching to the structure; an outer support; an inner support slidable within an interior of the outer support; a tire attached to the inner support; and a stop member extending from the outer support to engage the tire when the inner support is retracted into the outer support. An outer surface of the inner support is configured to be mateable with an inner surface of the outer support, thereby preventing rotation therein while permitting longitudinal movement with respect to the outer support. In another aspect, an assembly includes an axle attached to the inner support for the attachment of a ground engaging member.

A method of leveling a structure comprises placing a socket tool onto a head of a first threaded rod; rotating the head of the first threaded rod in a substantially horizontal plane with the tool to thereby cause substantially vertical movement of a first portion of the structure; placing the socket tool onto a head of a second threaded rod; and rotating the head of the second threaded rod in a substantially horizontal plane with the tool to thereby cause substantially vertical movement of a second portion of the structure; thereby causing substantially vertical movements of the first and second portions of the structure until the structure is horizontally level.

BRIEF DESCRIPTION OF THE DRAWINGS

FIGS. 4A and 413 are perspective views of the wheel assembly in a retracted position, without a tire thereon.

DETAILED DESCRIPTION

Figure 1:
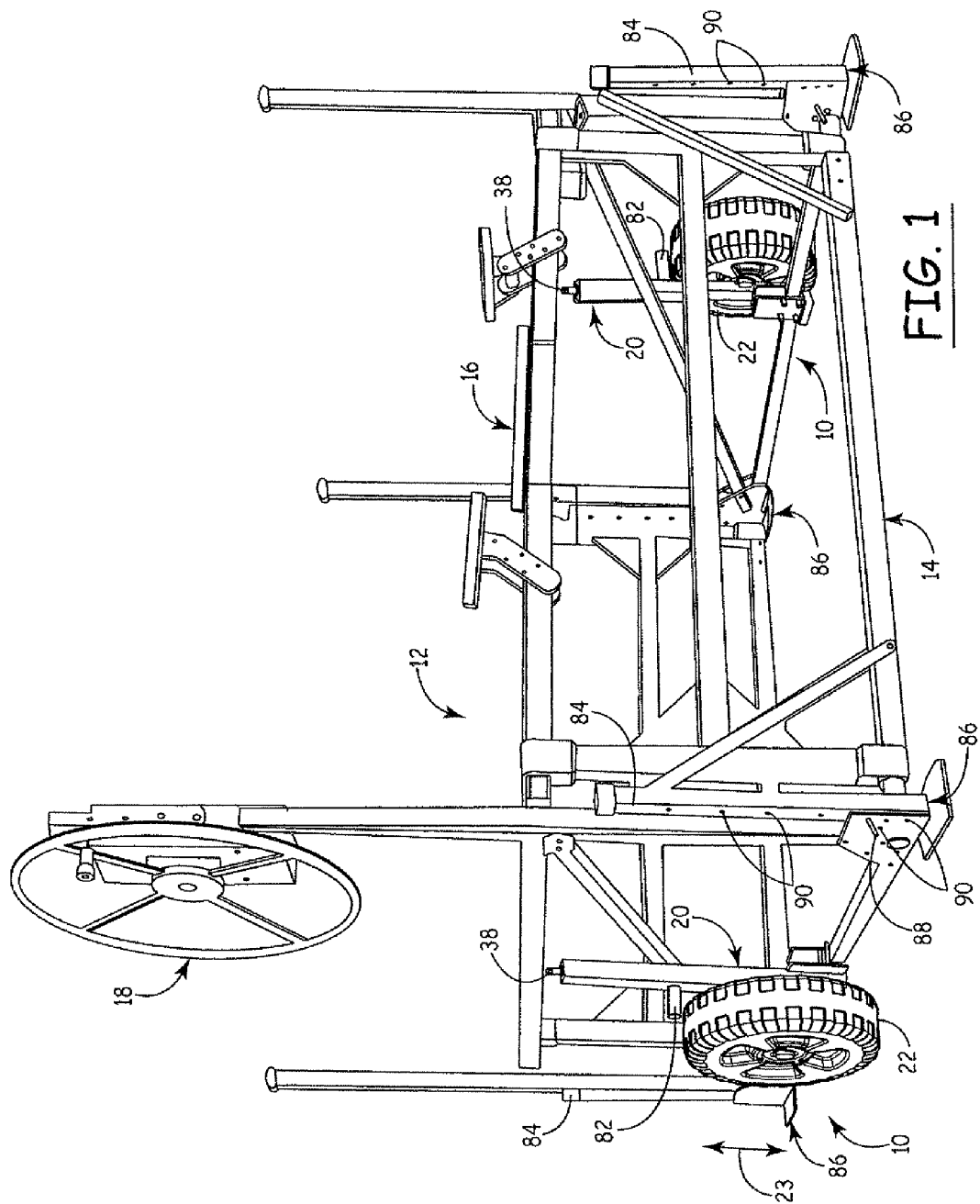
FIG. 1 is perspective view of a pair of exemplary wheel assemblies attached to a boat lift.

A pair of wheel assemblies 10 attached to a freestanding boat lift 12 is illustrated in FIG. 1. The boat lift 12 typically has a main structure 14 to which a movable boat support 16 is attached. A boat (not illustrated) is floated over the boat support 16 and a lifting mechanism 18 raises the boat support underneath the boat, thereby lifting the boat out of water. Conversely, when the boat support 16 is lowered, the boat is set upon the water to float freely.

A retractable mechanism of this disclosure is generally indicated at 20. Two such mechanisms are attached to the structure 14. It will be appreciated that more than two mechanisms 20 may be attached, and structure 14 shown specifically as a boat lift may have three, four or more such retractable structures 20. The structure 20 carries a tire 22 that can be raised in an upward direction or lowered in a downward direction as generally indicated by arrow 23.

Figure 2:
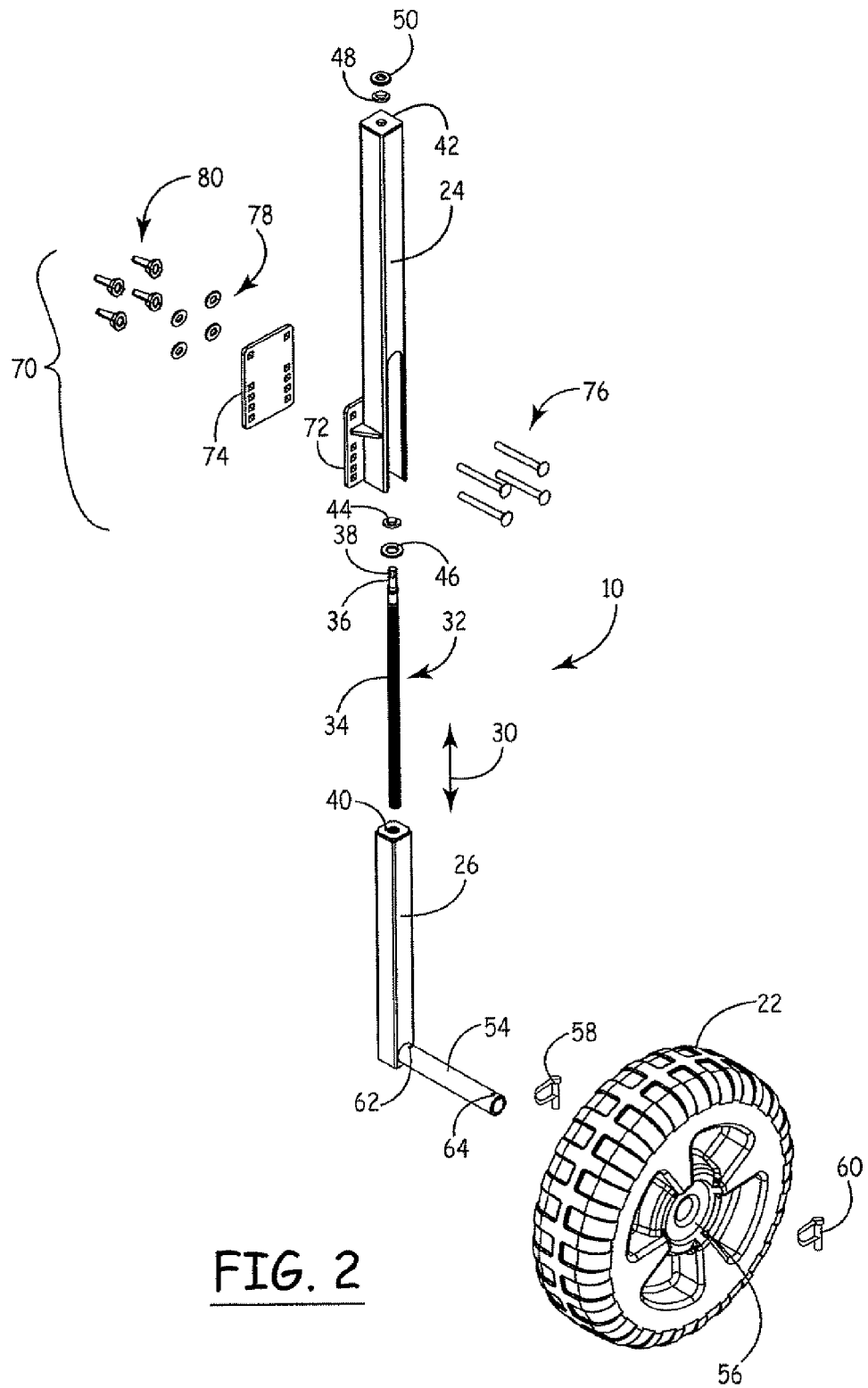
FIG. 2 is an exploded perspective view of the wheel assembly.

Referring to FIG. 2, the structure 20 has a main tubular support 24. A slidable support 26 is inserted within the interior of the main support 24. The slidable support 26 slides within the main support 24, in the vertical directions indicated by arrow 30. The support 24 has an interior chamber of a configuration that matches the exterior configuration of support 26 to prevent rotational movement while permitting longitudinal movement. In the embodiment illustrated, this configuration in cross section is rectangular or square. Other configurations, such as hexagonal for example, may also be used.

The slidable inner support 26 is secured within an interior of the outer support 24 by a threaded rod 32. The threaded rod 32 has a threaded section 34, a non-threaded top section 36 and head 38. The threaded rod 32 is also inserted within the support 24, with the threaded section 34 threadably engaging threaded aperture 40 of the support 26 while non-threaded top section 36 extends through aperture 42 of the support 24. The aperture 42 is not threaded and the non-threaded top section 36 rotates freely therein.

To help keep the assembly together of the main support 24 and the slidable support 26, bushing 44 and retaining washer 46 are positioned between the top surface of the slidable support 26 and the interior surface of the top of the support 24, with the non-threaded portion 36 extending through the aperture 42. Similarly, bushing 48 is situated on top of the post 24 and held in place by retaining washer 50. The head 38 of the threaded rod 32 extends through the retaining washer 46, bushing 44, aperture 42, bushing 48 and retaining washer 50. It will be appreciated that the threaded rod 32 can be turned, freely spinning within the aperture 42 while threadably engaging the aperture 40. When the rod 32 is turned, the slidable support 26 travels longitudinally, in the directions of arrow 30, within the support 24.

The head 38 is configured to be engaged by a socket tool. Exemplary configurations include a hexagonal or square head having 8 or 4 gripping surfaces, respectively. A user engages the head 38 from above with a tool (not shown) such as a manual ratchet or an electric handheld tool such as a drill or screwdriver with a socket attachment. The tool rotates head 38 in substantially horizontal plane of rotation 37 (labeled in FIGS. 3A-4D). Head 38 is fixedly attached to threaded rod 32, which is threadably engaged with threaded aperture 40 of slidable support 26. The support 26 cannot rotate because of the mating surface configurations of the outer surface of support 26 with the inner surface of support 24. Accordingly, rotation of threaded rod 32 forces the slidable support 26 to travel in the substantially vertical direction of arrows 30, depending on which way the head 38, and thereby the threaded rod 32, is turned.

The tire 22 rotates about an axle 54. The axle 54 is inserted into an axle housing 56 of the tire 22. Retaining pins 58 and 60 are inserted into apertures 62 and 64 in the axle 54 on opposing sides of the tire 22, thereby retaining the tire 22 in place.

The retractable wheel assembly 10 is attached to the structure 14 of the boat lift 12 by an attachment mechanism 70. In the illustrated embodiment, attachment mechanism 70 comprises a first plate 72 permanently secured, such as by welding, to the support 24. An opposing second plate 74 is positioned on an opposing side of a member of the structure 14 to which the retractable mechanism 20 is attached, as best illustrated in FIG. 1. Bolts 76 extend through aligned apertures of the plates 72 and 74 and are secured in place by washers 78 and nuts 80.

With the wheels in their retracted position, as illustrated in FIG. 1, and with the tires 22 submerged under water, the tires 22 may rotate due to water movement such as produced by waves. Stop member 82, extending from support 24, frictionally engages the tire 22 when the tire 22 is in the retracted position, thereby preventing the tire 22 from rotating. In one embodiment, stop member 82 is shaped and sized to engage a tread indentation 83 on tire 22 to mechanically prevent rotation of tire 22.

As illustrated in FIG. 1, a typical boat lift 12 has a height adjustable leg 84 at each corner 86 that engages the ground under the water. A common problem encountered by owners of boat lifts 12 is that the ground under the lift and under the water surface is not level. Leveling a lift 12 typically entails going into the water, lifting the boat lift 12, and adjusting the height of each of the legs 84 as needed. Such height adjustment typically requires one to submerge himself in the water in order to pull out pin 88 and reinsert it into the desired aperture 90 in leg 84. Since adjusting the height of a leg 84 in one corner 86 will tilt the entire lift 12, the leveling process usually requires an iterative process in which one to goes back and forth between legs, adjusting and readjusting, until the entire lift 12 is level. Although the lift's buoyancy in the water reduces its effective weight, such work can nevertheless be exhausting.

Wheel assemblies 10 may also be used to aid in leveling a boat lift 12 positioned in the water. Accordingly to an exemplary method for leveling a boat lift 12, four retractable wheel assemblies 10 of this disclosure are attached to the boat lift 12, with one wheel assembly 10 positioned near each of the four corners 86 of the boat lift 12. A person may walk on the dock or boat lift structure, thereby staying dry, and engage the head 38 of each wheel assembly 10 with a socket tool to raise or lower the wheel assembly 10 either upwardly or downwardly at each of the four corners 86 until the boat lift 12 is level. After the boat lift 12 has been leveled, the person may enter the water to adjust the legs 84 of the boat lift 12 downward, thereby setting the legs 84 on the ground. Because the wheel assemblies 10 are holding the lift 12 up, the person need not manually raise the lift 12 in order to adjust the legs 84. The tires 22 of the retractable wheel assemblies 10 are then retracted upwardly, leaving the boat lift standing on its own four legs 84.

Wheel assemblies 10 also allow for easy adjustment of a boat lift's height in response to changes in the water level. This task is simply accomplished by engaging the head 38 of the screw 32 of each of the mechanisms 20, thereby adjusting the effective height of the boat lift 12. In one embodiment of this disclosure, the boat lift 12 may be adjusted approximately 20 inches upwardly from contact with the ground.

Figure 3A:
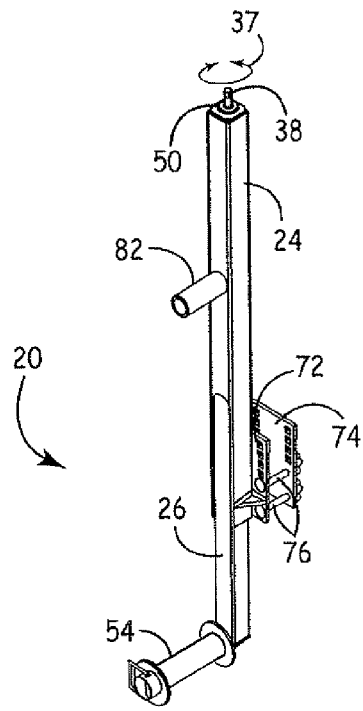
FIGS. 3A and 3B are perspective views of the wheel assembly in an extended position, without a tire thereon.
Figure 3B:
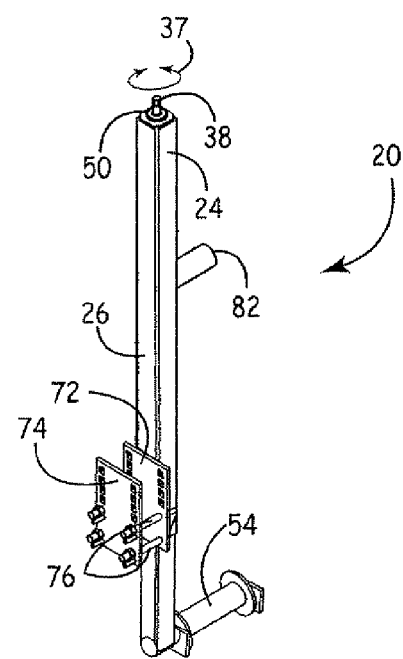
Figure 3C:
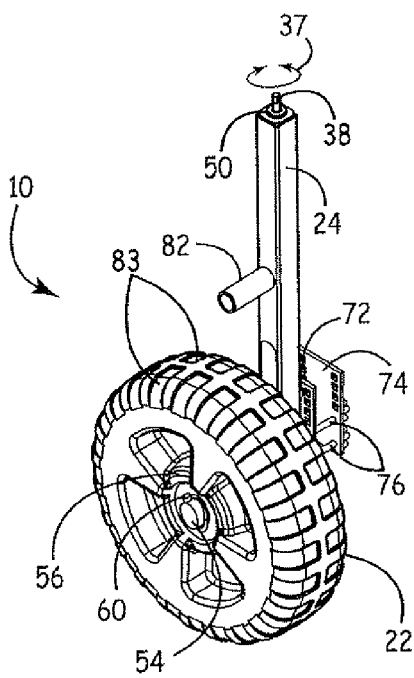
FIGS. 3C and 3D are perspective views of the wheel assembly in an extended position, with a tire thereon.
Figure 3D:
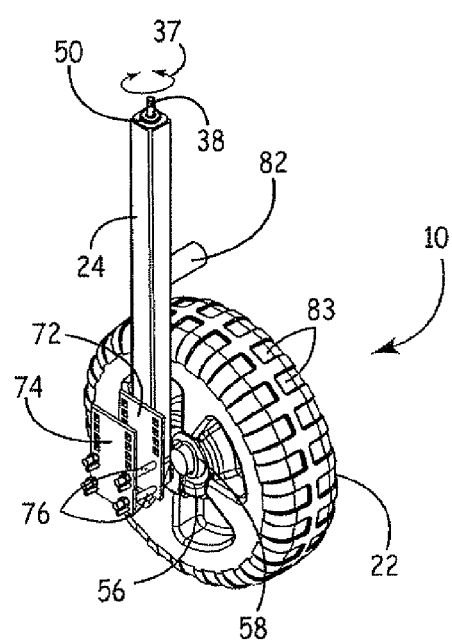
Figure 4A:
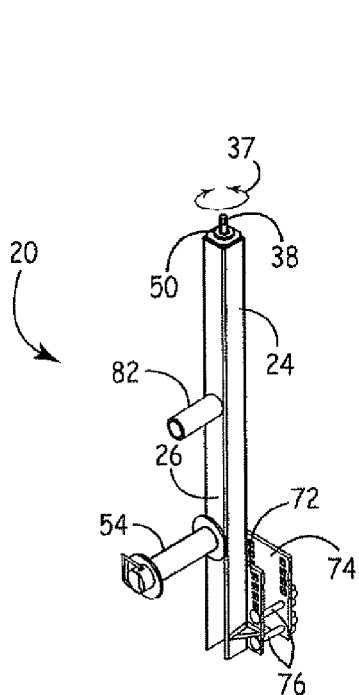
Figure 4B:
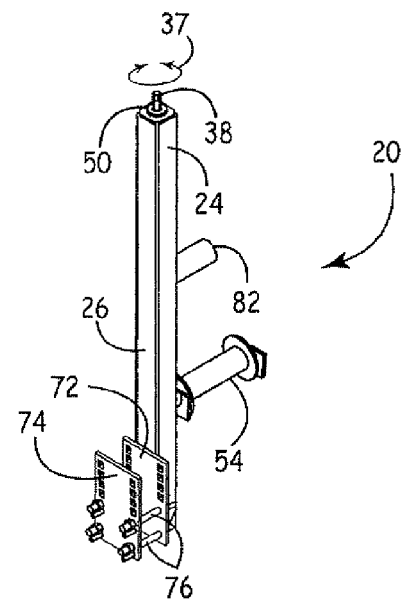
Figure 4C:
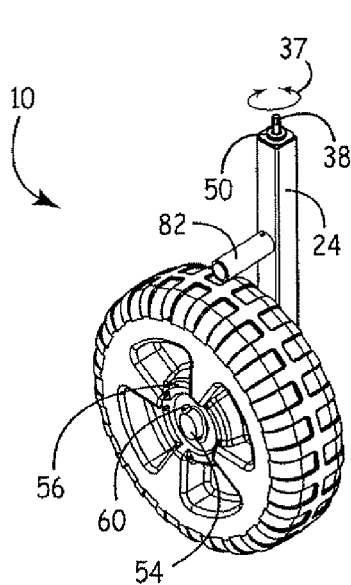
FIGS. 4C and 4D are perspective views of the wheel assembly in a retracted position, with a tire thereon.
Figure 4D:
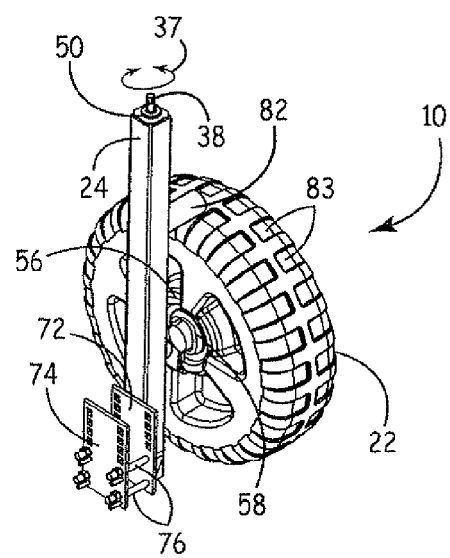

It will be appreciated that wheel assemblies 10 can also be secured to structures similar to boat lift 12 such as ice houses, for example. In northern climates where the top surface of lakes freeze in the winter, ice fishing through a hole cut in the ice layer is a popular activity. It is common for ice fishermen to move a structure such as an ice house onto the lake to serve as a shelter from the elements while ice fishing. Such ice houses are commonly towed onto a lake with a truck. To facilitate such towing, an ice house equipped with wheel assemblies 10, with tires 22 in the extended position shown in FIGS. 3C and 3D, is attached to a truck. Once in the desired location, the head 38 of each wheel assembly 10 is turned to retract slidable supports 26 into support posts 24, as shown in FIGS. 4C and 4D, thereby setting the ice house onto the ice.

Such retraction prevents undesirable movement of the house down on the ice. When the ice fishing season is over, the head 38 of each wheel assembly 10 is turned in the opposite direction to extend the tires 22 downwardly, thereby lifting the ice house off the ice and facilitating its removal from the lake.

Figure 5A:
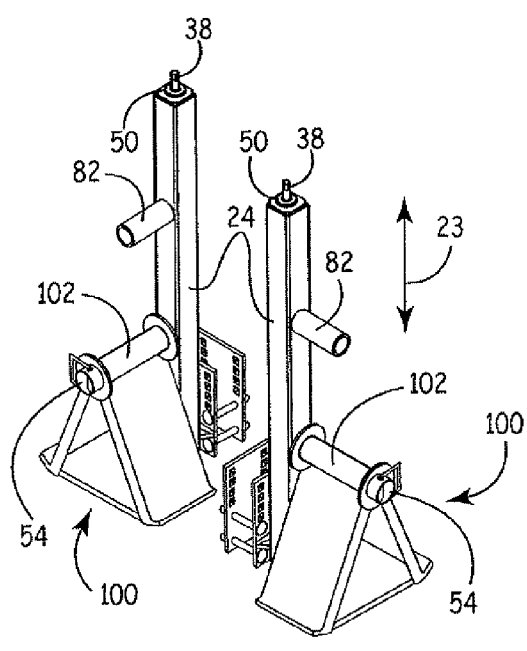
FIG. 5A is a perspective view of the ground engaging pad attached to the wheel assembly.
Figure 5B:
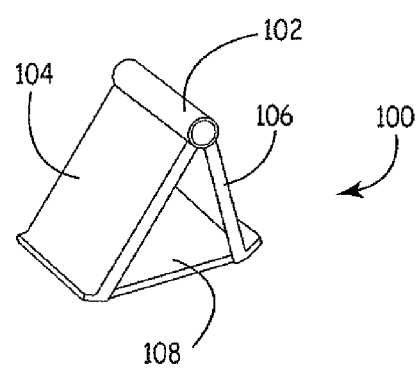
FIG. 5B is a perspective view of an exemplary ground engaging pad.

Referring to FIGS. 5A and 5B, this disclosure also includes a ground-engaging pad, generally indicated at 100. In an exemplary embodiment, ground-engaging pad 100 is positioned on the axle 54 as a replacement for the tire 22 and is made from durable, light-weight and corrosion-resistant aluminum. Ground engaging pad 100 includes an axle housing 102 and first and second legs 104 and 106 extending from the axle housing 102 in a diverging manner. First and second legs 104 and 106 are attached at their lower ends to a ground engaging base 108. FIG. 5A illustrates the ground engaging pad 100 attached to the axle 54. Retaining pins 62 and 64, as discussed with reference to FIG. 2, retain the ground engaging pad 100 in place in the same manner as such retaining pins retain the tire 22 on the axle 54.

The ground engaging pad 100 is useful in those situations where the boat lift 12 does not have extendable legs or the boat lift 12 is left permanently in the water in those climates where the water does not freeze. In an exemplary method, the boat lift 12 is set out in the water using the tires 22 of the retractable wheel assembly 10 of this disclosure. Once the boat lift 12 is in place, the tires 22 are retracted upwardly, thereby disengaging from the ground. The boat lift 12 will thus engage the ground beneath the water surface. The tires 22 are then removed from the retractable mechanisms 20. In their place, ground engaging pads 100 are attached to the axles 54 and held in place with the retaining pins. The ground engaging pads 100 are then moved downwardly using a socket tool with head 38 of screw 32 of each mechanism 20. Once the pads 100 engage the ground beneath the water, the boat lift 12 may be leveled, as previously described, by adjusting each of the retractable mechanisms 20 in the directions of arrow 23.

Although the present invention has been described with reference to preferred embodiments, workers skilled in the art will recognize that changes may be made in form and detail without departing from the spirit and scope of the invention.

What is claimed is:

1. An assembly for attaching to a boat lift, the assembly comprising:
    a boat lift attachment mechanism for attaching to the boat lift;
    an outer support;
    an inner support slidable within an interior of the outer support;
    wherein an outer surface of the inner support is configured to be mateable with an inner surface of the outer support, thereby preventing rotation therein while permitting longitudinal movement with respect to the outer support;
    a retractable wheel assembly comprising a tire attached to the inner support; and
    a stop member extending from the outer support to engage the tire and prevent rotation of the tire when the inner support is retracted into the outer support.

2. The assembly of claim 1 wherein the tire comprises a plurality of indentations, and wherein the stop member is configured to engage one of the plurality of indentations.

3. The assembly of claim 1 further comprising a threaded rod threadably attached to the inner support.

4. The assembly of claim 3 further comprising a socket head disposed on one end of the threaded rod.

5. An assembly for attaching to a boat lift, the assembly comprising:
    a boat lift attachment mechanism for attaching to the boat lift;
    an outer support;
    an inner support slidable within an interior of the outer support;
    wherein an outer surface of the inner support is configured to be mateable with an inner surface of the outer support, thereby preventing rotation therein while permitting longitudinal movement with respect to the outer support;
    an axle attached to the inner support; and
    a tire stop member extending from the outer support to engage a tire and prevent rotation of the tire when the tire is in a retracted position.

6. The assembly of claim 5 further comprising a ground engaging member having an axle housing configured to slide onto the axle.

7. The assembly of claim 6 wherein the ground engaging member comprises a pair of diverging legs, each of the legs connected to a base.

8. The assembly of claim 5 further comprising a threaded rod threadably attached to the inner support.

9. The assembly of claim 8 further comprising a socket head disposed on one end of the threaded rod.

10. A method of leveling a boat lift, the method comprising:
    placing a socket tool onto a head of a first threaded rod;
    rotating the head of the first threaded rod in a substantially horizontal plane with the tool to thereby cause substantially vertical movement of a first portion of the boat lift;
    placing the socket tool onto a head of a second threaded rod; and
    rotating the head of the second threaded rod in a substantially horizontal plane with the tool to thereby cause substantially vertical movement of a second portion of the boat lift;
    each threaded rod being attached to a wheel assembly of the lift;
    thereby causing substantially vertical movements of the first and second portions of the boat lift until the boat lift is horizontally level; and
    retracting the wheel assemblies upwardly.

11. The method of claim 10 where rotating the heads of the first and second threaded rods is accomplished by manual use of a ratchet.

12. The method of claim 10 where rotating the heads of the first and second threaded rods is accomplished by an electric, handheld tool.

13. The method of claim 10 wherein the boat lift comprises a plurality of extendable legs, the method further comprising extending each of the plurality of legs to contact a ground surface.

* * * * *

UNITED STATES PATENT AND TRADEMARK OFFICE
CERTIFICATE OF CORRECTION

| | | |
|---|---|---|
| PATENT NO. | : 8,596,906 B2 | Page 1 of 1 |
| APPLICATION NO. | : 12/682663 | |
| DATED | : December 3, 2013 | |
| INVENTOR(S) | : Ebbenga et al. | |

It is certified that error appears in the above-identified patent and that said Letters Patent is hereby corrected as shown below:

On the title page item (75) Inventors, "Dana Haliberg" should be --Dana Hallberg--

Signed and Sealed this
Fifteenth Day of July, 2014

Michelle K. Lee
*Deputy Director of the United States Patent and Trademark Office*